Feb. 10, 1931.   W. K. VOSS   1,791,543

POWER PLANT MOUNTING

Filed Oct. 28, 1926

Inventor:
Walter K. Voss
By Wallace R. Lane
Attys

Patented Feb. 10, 1931

1,791,543

UNITED STATES PATENT OFFICE

WALTER K. VOSS, OF DAVENPORT, IOWA

POWER-PLANT MOUNTING

Application filed October 28, 1926. Serial No. 144,902.

The present invention relates to mountings or supports for power plants adapted to operate mechanisms, such as that of a washing machine or the like.

Among the objects of the invention is to provide a novel mounting for a power plant so constructed and arranged that any vibrations set up by the plant will not be transmitted to the machine being operated by the plant. The machine will be absolutely quiet and without any vibration during its operation.

Another object of the invention is to provide a novel mounting or support that may be readily moved with the machine when the latter is moved about and yet be so connected or associated therewith that the mounting or support may not sway relative thereto but may have an up and down movement without that movement being transmitted to the machine.

The invention also comprehends associating such mounting to the machine by preferably a flexible connection, as by springs or the like, connecting the mounting or support for the power plant, as at an end thereof, to a part of the machine, such as to a frame or frame part thereof, and also supporting the mounting, as at the other end thereof, by means, such as roller or caster means, for free movement of the mounting over the floor or like supporting surface, over which the machine may be moved about. Flexible means, such as a link connection which may be pivotally connected, may be connected to the mounting or support and to the machine, as to a frame or frame part thereof, capable of permitting vertical or up and down movements or vibrations of the mounting but preventing lateral swaying of the mounting or support when the machine is being moved about, as over a floor or like supporting surface. Such vibrations will not be transmitted to the machine owing to the flexible connection above mentioned.

The invention also comprehends other features, advantages, capabilities, and objects which will later appear and are inherently possessed thereby.

Figure 1:
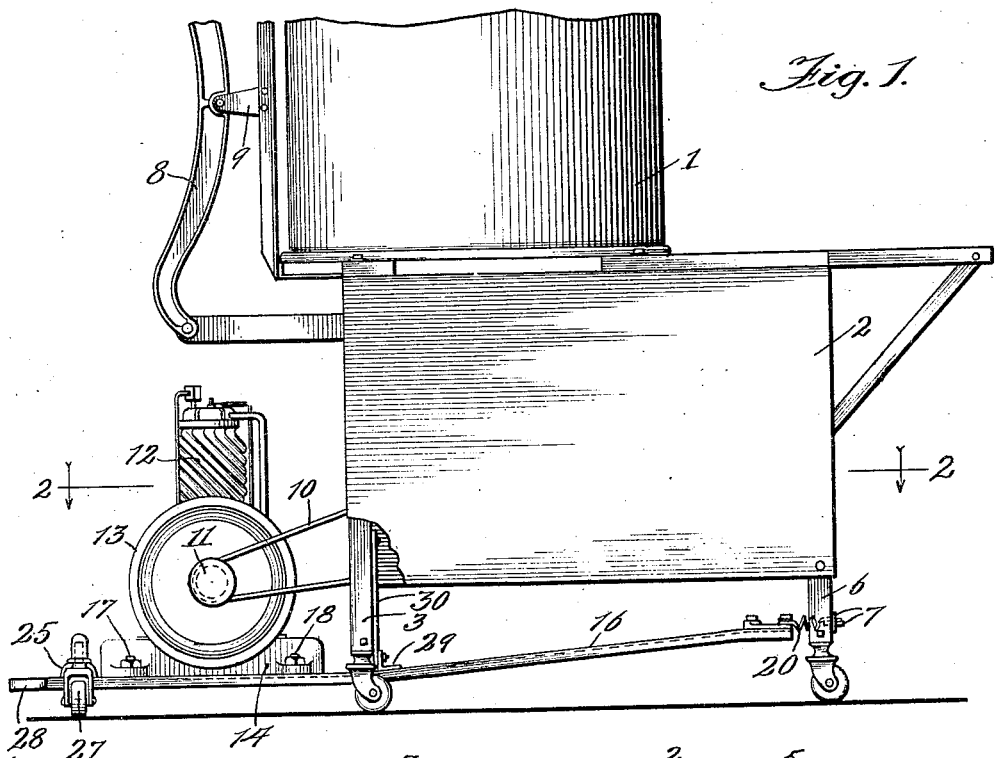

Referring to the drawings, Fig. 1 is a view in vertical elevation of a washing machine embodying an embodiment of the invention.

Figure 2:
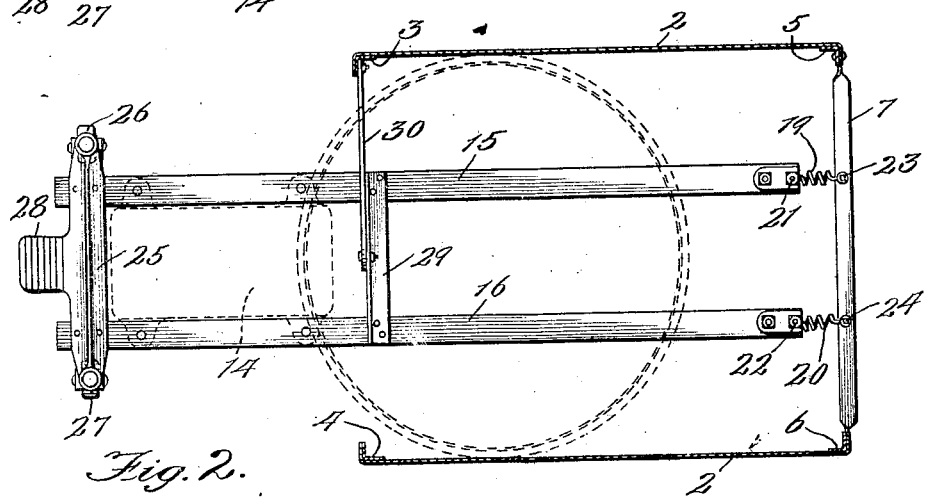

Fig. 2 is a horizontal sectional view taken in a plane represented by line 2—2 in Fig. 1 of the drawings.

Referring now more in detail to the drawings, the embodiment selected to illustrate the invention is shown in connection with a washing machine having a tub 1 mounted upon a stand or frame 2 supported by legs 3, 4, 5 and 6, between the latter of which may be connected a cross bar 7 in any suitable manner. Within the frame 2 may be supported in any desired manner, suitable operating mechanism for operating through a lever 8 pivoted to a frame member 9 to operate the mechanism within the tub, such as a dolly or the like, (not shown). This mechanism is also adapted to operate suitable wringer mechanism (not shown).

The operating mechanism within the frame or casing 1 is preferably driven by a belt 10 driven by a pulley 11 of an internal combustion engine 12 having a fly wheel 13. This engine or power plant has a base 14 secured to a pair of mounting members 15 and 16 as by way of bolts 17 and 18. The members 15 and 16 extend within the frame 2 and are connected at their inner ends by means of helical springs 19 and 20, the springs being connected to the members 15 and 16 in any suitable manner as by way of bolts 21 and 22, and at their other ends to the cross member 7 also in any suitable manner as by way of bolts or the like 23 and 24. The other ends of the members 15 and 16 extend outwardly from the machine between the legs 3 and 4 and are connected to a caster member or plate 25 extending beyond the sides of the pair of members 15 and 16 and provided with casters 26 and 27, this plate 25 also being provided with a foot plate 28 when it is desired to help move the machine and the mounting, when the machine is moved about.

In order to prevent the swaying of the mounting when moving the machine about, the mounting members 15 and 16 are connected intermediate their ends thereof by a cross member or bar 29 to which may be pivotally connected a link 30, the latter being pivotally connected at its lower end to a flange of the bar 29 and at its upper end to a flange of the leg 3, all as clearly shown in Figs. 1 and 2 of the drawings. It will be noted that this link, being thus pivotally connected, will permit the up and down movements or vibrations of the mounting, but will also prevent any material lateral swaying of the mounting relative to the machine when the latter is being moved about over a substantially level floor or similar supporting surface.

It will be noted that the mounting is supported partly upon the floor by way of the caster means 25—26—27, and at the other end by means of the flexible connections or springs 19 and 20. These springs are capable of contraction and expansion axially of the springs and also of flexure laterally thereof. It will also be noted that the power plant is supported at the end of the supporting members 15 and 16 adjacent to or near the caster means 25—26—27 so that the great majority of the weight of the load will be taken up by the caster means and only a small fraction of the weight will be felt at the springs 19 and 20. Any vibrations that might be set up by the power plant will not be transmitted by the mounting elements or members 15 and 16 to the frame of the machine, by reason of the springs 19 and 20 flexing and being incapable of transmitting such vibrations. Vibrations that tend to move the mounting in an up and down movement, will not be effective through the link 30 by reason of the latter being pivotally connected and swinging about the axes of the pivots thereof without transmitting any vibrations longitudinally of the links. Since the operating mechanism upon the machine is driven by a belt 10, the vertical vibration of the engine will not be transmitted through this belt and hence no vibration can in this way also be transmitted to the machine.

In experiments with this type of device, it has been found that the machine can be operated with absolute quietness and without any kind of vibration, irrespective of the amount of vibration that might be set up by the power plant.

Having thus described and upon the drawing illustrated an embodiment of the invention, it is to be understood that the same is not limited thereto but may comprehend other features, constructions, arrangements of parts and details without departing from the spirit thereof.

Having thus disclosed the invention, I claim:

1. A power plant mounting, a device to be operated by said plant, a support for the plant, means for flexibly supporting an end of said support from said device, means for movably supporting the other end of said support upon a floor, whereby the support may move with said device when the latter is moved over the floor, and means flexibly connected to a part of said support and to a part of said device for preventing material lateral swaying of the support relative to said device but permitting vertical movement thereof.

2. A power plant mounting, a device to be operated by said plant, a support for the plant, flexible means connected to one end of the support and to said device, a caster device connected to the other end of the support and adapted to move over a floor whereby the support may move with the device when moved over the floor, and a connecting link pivotally connected to said support and to said device for preventing material lateral swaying of the support relative to said device but permitting up and down movements thereof.

3. A power plant mounting for washing machines having a frame, comprising supporting members, springs connecting an end of said members to said frame, roller means connected to the other end of said members and adapted to movably support said end of said member upon a floor, and a power plant on said members and adapted to drive mechanism on the frame.

4. A power plant mounting for washing machines having a frame, comprising supporting members, springs connecting an end of said members to said frame, roller means connected to the other end of said members and adapted to movably support said end of said members upon a floor, a power plant on said members and adapted to drive mechanism on the frame, and a link connection pivotally connected to said frame and to said members for preventing material lateral swaying of the support relative to the frame when the latter is moved over the floor.

5. A power plant mounting associated with a device to be operated by said plant, comprising a support for the plant, and having an end adapted to rest upon the floor, flexible means connecting the other end of said support to said device, and a movable member pivoted to said device and intermediate the ends of said support.

6. A power plant mounting associated with a device to be operated by said plant, comprising a support for the plant and having an end resting on the floor, means connecting an end of said support and device for preventing transmission of vibratory movements therebetween, and a link member pivoted to said device and to said support.

7. A power plant mounting associated with a device to be operated by said plant, comprising a plant support movable over the floor and being flexibly connected to said device, and a link member pivotally connected to said device, and to said support.

In witness whereof, I hereunto subscribe my name to this specification.

WALTER K. VOSS.

CERTIFICATE OF CORRECTION.

Patent No. 1,791,543. Granted February 10, 1931, to

WALTER K. VOSS.

It is hereby certified that error appears in the printed specification of the above numbered patent requiring correction as follows: Page 2, line 116, claim 4, for the word "support" read members; and that the said Letters Patent should be read with this correction therein that the same may conform to the record of the case in the Patent Office.

Signed and sealed this 28th day of April, A. D. 1931.

(Seal)

M. J. Moore,
Acting Commissioner of Patents.